June 9, 1925.  
F. A. FORTIN  
TIRE REMOVER  
Filed Nov. 6, 1924
1,541,491
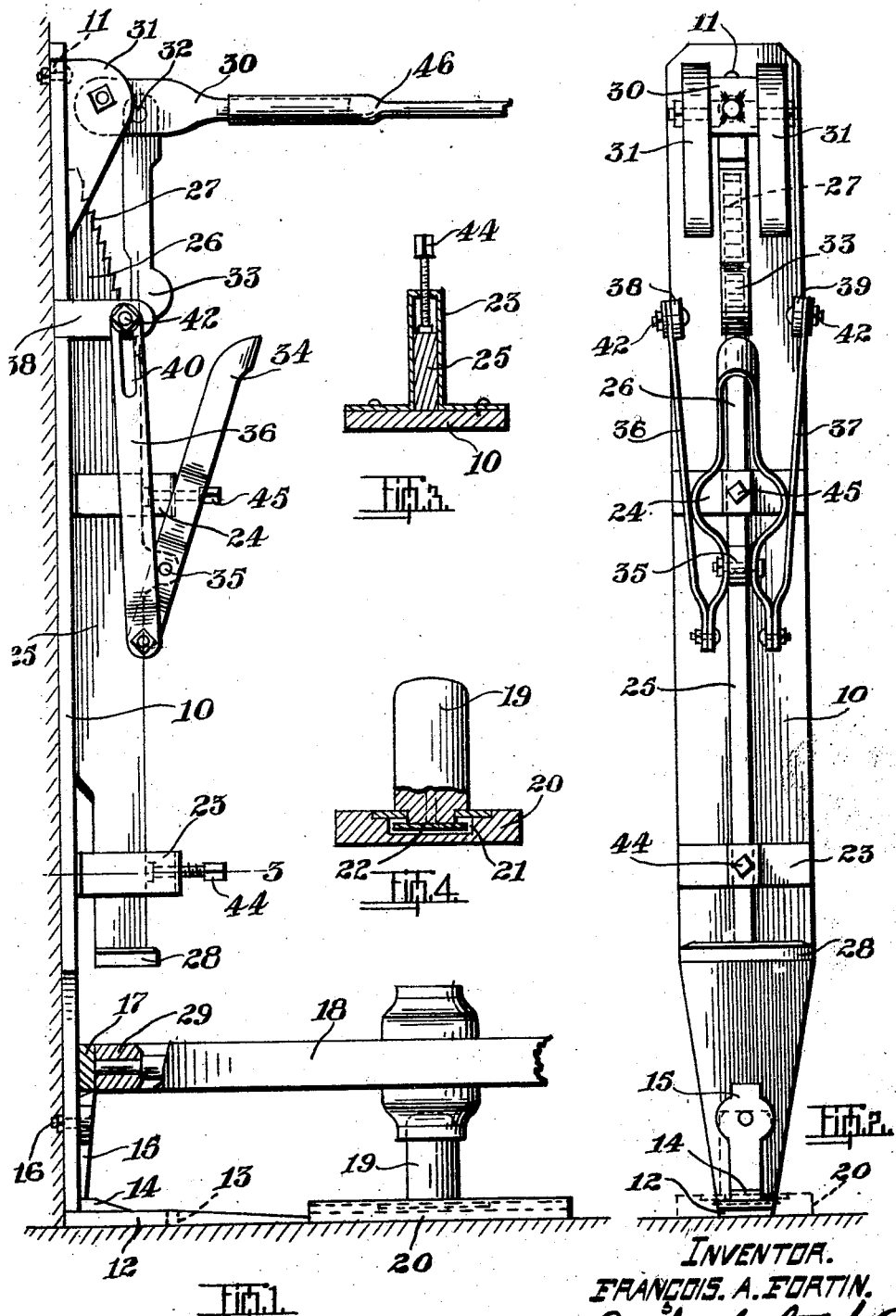
INVENTOR.
FRANÇOIS. A. FORTIN.
BY
ATT'YS.

Patented June 9, 1925.

1,541,491

UNITED STATES PATENT OFFICE.

FRANÇOIS ALFRED FORTIN, OF PINCHER CREEK, ALBERTA, CANADA.

TIRE REMOVER.

Application filed November 6, 1924. Serial No. 748,172.

*To all whom it may concern:*

Be it known that I, FRANÇOIS ALFRED FORTIN, a subject of the King of Great Britain, and resident of Pincher Creek, in the Province of Alberta and Dominion of Canada, have invented certain new and useful Improvements in Tire Removers, of which the following is a specification.

This invention relates to improvements in tire removers and particularly to means for removing tires from wagon wheels and the like, and the objects of the invention are to provide a simply constructed, durable and easily handled device of this character in which the several parts are so arranged and constructed that they will more satisfactorily perform the various functions required of them.

Referring now to the drawings, in which like characters of reference indicate corresponding parts in each figure:

Figure 1 is a side elevation of my improved device.

Figure 2 is a front elevation.

Figure 3 is a section on line 3—3 of Figure 1.

Figure 4 is a cross section of the movable pivot.

In the drawings, 10 designates a standard or support of any suitable form and adapted, through the opening 11 in the top, to be fixedly secured to a wall or the like, the bottom of the standard being provided with a foot 12 protruding at right angles therethrough and having an orifice 13 therein whereby it can be fixedly secured. On the inner end of the foot is a block 14 and at right angles to this and fitting into a recess therein is a vertical block 15 fixedly secured to the support 10 by means of a bolt 16.

This block 15 is designed to engage the tire 17 of a wheel 18, as illustrated in Figure 1, the wheel being mounted on a pivot member 19 slidably mounted in a suitable base 20 having a guideway 21 therein adapted to engage with guide plate 22 on the base of said pivot member 19.

Slidably mounted on the support 10 in brackets 23 and 24 is a pressure-exerting member 25 comprising a vertical section 26 formed at its upper end with a ratchet 27 and at its lower end with a plate 28 suitably curved to engage with the felloes 29 of the wheel 18 to exert pressure thereon.

For operating the member 25 I provide at the top of the support 10 a bifurcated handle 30 pivotally mounted in brackets 31. This handle is designed to form a lever and has pivotally mounted therein at 32 a dog 33 designed to engage with ratchet teeth 27. To move the member 25 upwardly out of engagement with the felloe of a wheel I provide a lever 34 pivotally mounted on the member 25 at 35 and pivotally connected through links 36 and 37 with bracket members 38 and 39 on each side of the support 10, the links 36 and 37 being formed with slots 40 to engage with bolts 42 through said bracket members. To retain the member 25 in upward position it is only necessary to swing the lever 34 into raised position, as shown in Figure 1.

It will be noted that this lever 34 is of skeleton formation adapted to fit over and on each side of the member 26. A sleeve member 46 is provided when additional leverage is required to the handle 30, the said member being readily removed. 44 and 45 are retaining screws in the bracket members 23 and 24.

In operation, the wheel 18 being placed in position, as shown in Figure 1, with the pivot member 19 extending through the hub, the lever 34 is swung downwardly over the bracket 23 allowing the member 25 to drop until the plate 28 engages with the felloes 29 of the wheel. Then there is exerted the necessary downward pressure on the felloes in opposition to the upward pressure exerted by the contact between the block 15 and the tire 17, the arm 30 being moved downwardly causing the dog 33 to engage with the teeth 27 one at a time until the necessary pressure is exerted on the felloes 29 and the member 26. When the tire is thus removed the lever arm 34 is swung back into position, as shown in Figure 1, raising the pressure-exerting member 25 away from the wheel.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A tire remover comprising a supporting frame, a block carried by said frame adapted to support a wheel tire, a pressure-exerting felloes-engaged member slidably mounted in said frame, means for raising and maintaining raised or letting drop said member, and means for exerting pressure on the felloes through said member on the latter being lowered, and adjustable pivotal means for supporting the wheel.

2. A device of the character described comprising a suitable frame, a tire-supporting block carried by said frame, a pressure-exerting member slidably mounted in said frame, a felloe-engaging plate carried by said member at one end and ratchet means formed on said member at the other end, a lever, means for raising and maintaining raised or letting drop said pressure-exerting member, and means for exerting pressure on said member in a lowered position.

3. The device as claimed in claim 2 in which the means for raising, maintaining raised or letting drop comprises a lever pivotally mounted on the pressure-exerting member, brackets carried by the frame, and slotted links connected at one end to said brackets and at the other end pivotally connected to said lever.

4. The device as claimed in claim 2 in which the means for exerting pressure on the pressure-exerting member in lowered position comprises brackets on the frame, a bifurcated lever arm pivotally mounted in said brackets, a dog pivotally carried by said lever and designed to engage with the ratchet means on the pressure-exerting member, and a handle for said lever arm.

5. In a device of the character described and in combination, a suitable frame, a tire-supporting block in said frame, a pressure-exerting member slidably mounted in said frame, and means carried by the pressure-exerting member adapted to engage with the felloes of a wheel to exert downward pressure thereon, a pivotally mounted lever on said member, and slotted link means connecting said lever with the frame, a ratchet formed on said member, and a dog member pivotally connected to a lever carried by the frame adapted to engage with said ratchet to convey pressure to the pressure-exerting member, and adjustable means adapted to extend through the wheel hub to support the wheel.

In witness whereof I have hereunto set my hand in the presence of two witnesses.

FRANÇOIS ALFRED FORTIN.

Witnesses:
  DONALD THOMSON,
  BLANCHE GREGORY.